April 25, 1961 P. LECULLIER 2,981,781

ONE-PIECE STORAGE BATTERY

Filed Jan. 19, 1959

United States Patent Office 2,981,781
Patented Apr. 25, 1961

2,981,781

ONE-PIECE STORAGE BATTERY

Pierre Lecullier, Neuilly-sur-Seine, France, assignor to Etablissements Ducellier, societe anonyme, Paris, France Filed Jan. 19, 1959, Ser. No. 787,484

Claims priority, application France June 9, 1958

1 Claim. (Cl. 136—135)

This invention relates to storage batteries and more particularly to one-piece storage batteries.

Storage batteries, notably of the type utilized for starting engines comprise several cells of which the terminals extend through the covers with the assistance of adequate sealing means, these terminals being connected in series, externally of the container, by means of connectors, usually lead connector bars. Sometimes these terminals are shifted relative to the axis of the revelant cells so that those of two contiguous cells will emerge, in close vicinity of the partition separating these two cells, in two cavities constituting complementary half-shells formed in the covers of each of these elements. The connector by which these terminals are interconnected is very short in this case; as a rule, it is surrounded by an intermediate member formed with two diametrally opposite wings bearing on the upper face of the covers of the two adjacent cells and maintaining them in position. The sealing means on the outer side of these terminals consists of the conventional luting compound.

Now it is the object of this invention to provide a one-piece storage battery of this general type which is characterized in that in each cover cavity there is provided at least one boss moulded integrally with the cover, and that the connectors between the terminals of any pair of adjacent cells are each formed with at least one extension associated with each boss, each extension being designed to bear on a boss of one of said covers and to keep the corresponding cover in position.

With this arrangement the intermediate members solid with the cell terminals which were heretofore conventional may be dispensed with; moreover the terminals used in batteries according to this invention are shorter than before, and finally the connectors may be positioned at a level lower than that of the upper face of the covers and embedded in the luting compound.

In order to afford a clearer understanding of this invention and of the manner in which the same may be carried out in the practice, reference will now be made to the accompanying drawing illustrating diagrammatically by way of example a typical form of embodiment of the invention. In the drawing.

Figure 1:
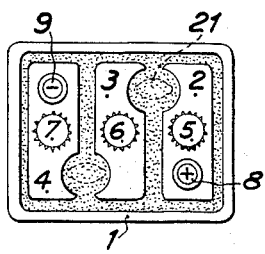
Figure 1 is a plan view from above of a storage battery constructed according to the teachings of this invention.
Figure 2:
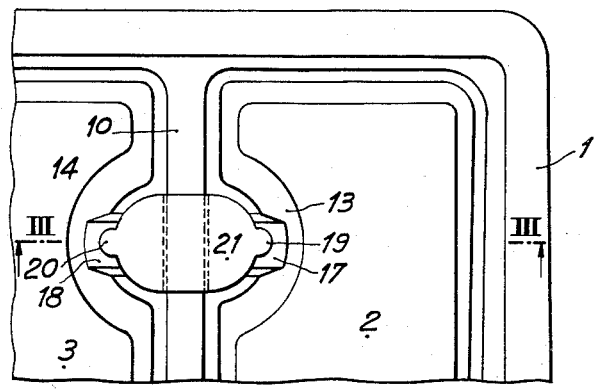
Figure 2 is a fragmentary plan view showing on a larger scale one portion of a battery before casting the luting joint.
Figure 3:
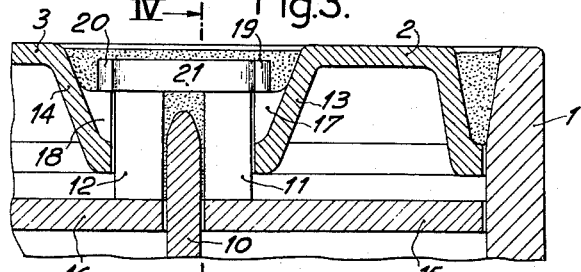
Figure 3 is a section taken upon the line III—III of Fig. 2, after casting the luting joint.
Figure 4:
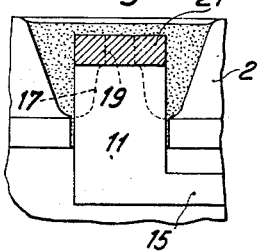
Figure 4 is a similar view but taken upon the line IV—IV of Fig. 3.

The storage battery 1 illustrated in the drawing comprises three cells closed by covers 2, 3 and 4, with electrolyte filling plugs 5, 6, 7, a positive battery terminal 8 and a negative battery terminal 9.

The contiguous cells closed by the covers 2 and 3 are separated by a partition 10 and comprise cell terminals 11, 12 respectively which lead into cavities 13 and 14 formed in said covers and having substantially the form of halfshells; these terminals are electrically connected by transverse plates 15 and 16 to provide the necessary connection between the different plates constituting each battery cell.

Each of said cavities 13, 14 has formed at its lower portion bosses 17, 18 molded integrally therewith and engaged by lugs 19, 20 formed on the connector 21 between the terminals 11 and 12. Thus, the covers 2 and 3 are held in position by these connectors. As shown, these lugs 19, 20 are diametrally opposed to each other on the connector 21.

The material cast for luting the joints between the edges of the covers and the inner walls of the battery container 1 and the partitions 10 will also seal the outer joint of terminals 11 and 12; the connectors 21 and their lugs 19, 20 are embedded in this material.

It must be pointed out that the form of embodiment which is described hereinabove is given by way of example only and should not be construed as limiting the invention as many modifications and alterations may be brought thereto without departing from the spirit and scope of the invention as set forth in the appended claim.

What I claim is:

In a one-piece storage battery comprising a plurality of cells, partitions separating adjacent cells, a molded cover covering each cell and having a cavity formed on each side parallel to said partitions, each cell having two connecting terminals at its upper portion, the connecting terminals of two adjacent cells projecting on either side of the relevant partition in said corresponding cover cavities, and connectors between the terminals of two adjacent elements, the improvement consisting in providing in each cavity of said covers at least one boss formed integrally with the cover material and providing on each connector at least one extension associated with each boss, each connector bearing with its extensions on the bosses solid with the covers to assist in holding said covers in position.

References Cited in the file of this patent

UNITED STATES PATENTS

| | | |
|---|---|---|
| 1,988,111 | Dunzweiler | Jan. 15, 1935 |
| 2,180,463 | Dunzweiler | Nov. 21, 1939 |
| 2,261,109 | Dunzweiler | Nov. 4, 1941 |